United States Patent [19]
Wen

[11] Patent Number: 6,102,513
[45] Date of Patent: Aug. 15, 2000

[54] INK JET PRINTING APPARATUS AND METHOD USING TIMING CONTROL OF ELECTRONIC WAVEFORMS FOR VARIABLE GRAY SCALE PRINTING WITHOUT ARTIFACTS

[75] Inventor: Xin Wen, Rochester, N.Y.

[73] Assignee: Eastman Kodak Company, Rochester, N.Y.

[21] Appl. No.: 08/928,003

[22] Filed: Sep. 11, 1997

[51] Int. Cl.[7] .................................................. B41J 2/205
[52] U.S. Cl. ............................................................ 347/15
[58] Field of Search ................................ 347/15, 76, 57, 347/252, 14

[56] References Cited

U.S. PATENT DOCUMENTS

| | | |
|---|---|---|
| 4,513,299 | 4/1985 | Lee et al. . |
| 4,679,057 | 7/1987 | Hamada .................................. 347/252 |
| 4,714,935 | 12/1987 | Yamamoto et al. . |
| 4,860,034 | 8/1989 | Watanabe et al. ......................... 347/14 |
| 4,959,659 | 9/1990 | Sasaki et al. . |
| 4,982,199 | 1/1991 | Dunn ......................................... 347/15 |
| 5,200,765 | 4/1993 | Tai ............................................ 347/15 |
| 5,361,084 | 11/1994 | Paton et al. . |
| 5,610,637 | 3/1997 | Sekiya et al. . |

FOREIGN PATENT DOCUMENTS

| | | |
|---|---|---|
| 0 292 292 A2 | 11/1988 | European Pat. Off. . |
| 0 437 236 A2 | 7/1991 | European Pat. Off. . |
| 0 663 760 A1 | 7/1995 | European Pat. Off. . |
| 0 725 531 A2 | 8/1996 | European Pat. Off. . |
| 0 893 258 A2 | 1/1999 | European Pat. Off. . |
| 0 893 260 A2 | 1/1999 | European Pat. Off. . |
| WO 98/08687 | 3/1998 | WIPO . |

OTHER PUBLICATIONS

Xin Wen and Rodney Lee Miller, "Digital Ink Jet Printing Apparatus and Method", filed Jul. 24, 1997, Application Serial No. 08/899,574.

Xin Wen, "Ink Jet Printing Apparatus and Method Accommodating Printing Mode Control", filed Jul. 24, 1997, Application Serial No. 08/899,616.

*Primary Examiner*—John Barlow
*Assistant Examiner*—Charles W. Stewart, Jr.
*Attorney, Agent, or Firm*—Walter S. Stevens

[57] ABSTRACT

Ink jet printing apparatus and method using timing control of electronic waveforms for variable gray scale printing while eliminating image artifacts and while also reducing printing time and improving accuracy of ink droplet placement on a receiver medium. More specifically the prints an output image on a receiver medium in response to an input image file defined by a plurality of pixels, each pixel obtaining a pixel value. The apparatus includes a print head and a plurality of nozzles integrally attached to the print head. Each of the nozzles is capable of ejecting a plurality of ink droplets therefrom. A waveform generator generates a plurality of electronic waveforms, each of the waveforms being defined by a plurality of electric pulses supplied to the nozzles for ejecting the ink droplets. A printer performance look-up table is also provided for storing a plurality of waveform serial numbers therein. Each of the waveform serial numbers is associated with each one of the electronic waveforms and each of the waveforms is defined by waveform parameters. A controller connected to the look-up table and the waveform generator generates the waveform parameters. This configuration allows the waveforms to accurately place the ink droplets on the receiver medium. A calibrator adapted to receive the input image file for converting the pixel values thereof to a plurality of waveform index numbers is associated with respective ones of the waveform serial numbers and outputs a calibrated image file. The apparatus further comprises an image halftoning unit connected to the calibrator for halftoning the calibrated image file. In addition, the apparatus includes a nozzle selector interconnecting the waveform generator and the print head for selecting predetermined ones of the nozzles for actuation.

20 Claims, 6 Drawing Sheets

| WAVEFORM SERIAL NUMBER (SNi) | PRINT DENSITY (Di) | T | 1st PULSE | | | 2nd PULSE | | | ... |
|---|---|---|---|---|---|---|---|---|---|
| | | | $A_1$ | $W_1$ | $S_{1-2}$ | $A_2$ | $W_2$ | $S_{2-3}$ | |
| $SN_1$ | D1 | T1 | 1 | 1 | 1 | 1 | | | ... |
| $SN_2$ | D2 | T2 | 1 | 1 | | | 0.8 | | ... |
| $SN_3$ | D3 | T3 | | | | | | | |
| $SN_4$ | D4 | T4 | ... | ... | ... | ... | ... | ... | ... |
| ... | ... | ... | | | | | | | |
| $SN_N$ | Dmax | $T_N$ | | | | | | | |

INK JET PRINTING APPARATUS AND METHOD USING TIMING CONTROL OF ELECTRONIC WAVEFORMS FOR VARIABLE GRAY SCALE PRINTING WITHOUT ARTIFACTS

FIELD OF THE INVENTION

The present invention generally relates to printing apparatus and methods and more particularly relates to an ink jet printing apparatus and method using timing control of electronic waveforms for variable gray scale printing while eliminating image artifacts caused by "quantization errors", visible noise and excessive ink laydown, and while also reducing printing time and improving accuracy of ink droplet placement on a receiver medium.

BACKGROUND OF THE INVENTION

An ink jet printer produces images on a receiver medium by ejecting ink droplets onto the receiver medium in an image-wise fashion. The advantages of non-impact, low-noise, low energy use, and low cost operation in addition to the capability of the printer to print on plain paper are largely responsible for the wide acceptance of ink jet printers in the marketplace.

However, a disadvantage associated with ink jet printers is that ink is ejected in discrete ink droplets; consequently, ink jet printers only print ink dots at discrete optical density levels. Therefore, unintended and extraneous ink dots give rise to undesirable image artifacts, which are most visible in low-density areas of the image on the receiver medium. Furthermore, due to the use of discrete optical densities, high bit-depth pixel values of a substantially continuous tone input digital image are necessarily "quantized" to the discrete density values available in a specific ink jet printer. However, when pixel values are quantized, "quantization errors" occur. These quantization errors produce image artifacts which may appear to the viewer of the image as posterization or contouring. Although quantization errors can be reduced by increasing the available levels of optical densities, such reduction of quantization errors increases printing time and ink laydown. Increased ink laydown on the receiver medium requires higher liquid absorption by the receiver medium, which is undesirable. Of course, increased printing time reduces the printer's production rate, which is also undesirable.

Methods for increasing available levels of optical densities are known. A method to increase available levels of optical densities is disclosed in U.S. Pat. No. 4,714,935 titled "Ink-Jet Head Driving Circuit" issued Dec. 22, 1987 in the name of Mitsuru Yamamoto, et al. According to this patent, the volume of an ejected ink droplet is varied by modulating electronic waveforms which activate ink droplet formation and ejection. These individual droplets are ejected from an ink jet nozzle and land separately on a receiver medium. This patent also discloses that ink volume can be modulated by a single electric pulse waveform, or by a plurality of electric pulse waveforms to control the operating dynamic printing range of the printer. However, the technique disclosed by this patent increases printing time and ink laydown due to increased levels of discrete optical densities.

U.S. Pat. No. 4,959,659 titled "Color Picture Timing Apparatus" issued Sep. 25, 1990 in the name of Takashi Saski, et al. discloses yet another method for increasing available levels of optical densities. According to this patent, a plurality of inks of different densities for each color are deposited on a receiver medium. Thus, an increase in printable ink densities is obtained by an increased number of available ink densities for each color. In addition, this method allows a plurality of ink droplets to be printed at each pixel location on the receiver medium by means of increased ink laydown. The disadvantages associated with this approach are the increased complexity and cost occasioned by the increased number of inks and ink cartridges in the printer. Another disadvantage of this method is that it results in increased ink laydown on the receiver medium.

The techniques disclosed by the art recited hereinabove print ink droplets at discrete optical densities. The techniques disclosed by the art recited hereinabove also cause quantization errors. Hence, these methods do not eliminate artifacts (i.e., extraneous visible discrete dots in the printed image). The techniques disclosed by the art recited hereinabove also increase ink laydown and printing time.

Another problem associated with prior art ink jet printers is image artifacts and visible noise caused by manufacturing variability among the plurality of ink jet nozzles comprising the print head. More specifically, variability in the print head fabrication process produces physical variability in the nozzles (e.g., variability in the size of nozzle orifices) comprising the print head. This variability in turn causes undesirable variability in ink droplet volume for droplets ejected from the nozzles. As a result, some nozzles will unintentionally print higher densities than other nozzles. Such variability causes visible noise and image artifacts, such as banding or streaks, along the direction of travel of the print head relative to the receiver medium. To reduce such visible image artifacts, some prior art ink jet printers resort to printing in multiple shingled passes over the same image area in a fashion such that each image location on the receiver medium is printed by different nozzles in each pass. In this case, print variability between nozzles is averaged out and the visual artifacts appear reduced. However, a disadvantage of this technique is that print time is substantially increased by a factor approximately equal to the number of passes.

A further problem associated with prior art ink jet printing devices relates to placement of the ink droplets on the receiver medium. More specifically, accuracy of ink droplet placement on a receiver is determined by, among other factors, the speed of ejected ink droplets and the duration of activation of the ink nozzles ejecting the ink droplets. In ink jet printers printing variable ink droplet volumes, speed of ejected ink droplets and the duration of the activation of the ink droplets can vary as a function of ink droplet volume. Variation in speed and activation of ink droplets often cause errors in placement of ink droplets having different volumes, thereby producing image defects such as ink coalescence or color bleeding on the receiver, unprinted white spots (sometimes referred as "pin holes") in a printed area, or unsharp lines and borders.

Therefore, there has been a long-felt need to provide an ink jet printing apparatus and method for variable gray scale printing while eliminating image artifacts caused by "quantization errors", visible noise and excessive ink laydown, and while also reducing printing time and improving accuracy of ink droplet placement on the receiver medium.

SUMMARY OF THE INVENTION

The present invention resides in an ink jet printing apparatus and method using timing control of electronic waveforms for variable gray scale printing while eliminating image artifacts caused by "quantization errors", visible noise and excessive ink laydown, and while also reducing printing time and improving accuracy of ink droplet placement on a receiver medium.

More specifically an ink jet printing apparatus is provided for printing an output image on a receiver medium in response to an input image file defined by a plurality of pixels. Each pixel obtains a pixel value. The apparatus includes a print head and a plurality of nozzles integrally attached to the print head. Each of the nozzles is capable of ejecting a plurality of ink droplets therefrom. A waveform generator is connected to the nozzles for generating a plurality of electronic waveforms, each of the waveforms being defined by a plurality of electric pulses supplied to the nozzles for ejecting the ink droplets. A printer performance look-up table is also provided. The printer performance lookup table is associated with the waveform generator for storing a plurality of waveform serial numbers therein. Each of the waveform serial numbers is associated with each one of the electronic waveforms and each of the waveforms is defined by waveform parameters of number of pulses, pulse amplitudes, pulse widths and delay time intervals between pulses. A controller is connected to the look-up table and the waveform generator for generating the waveform parameters. This configuration allows the waveforms to eject the ink droplets from the nozzles so as to accurately place the ink droplets on the receiver medium. A calibrator adapted to receive the input image file for converting the pixel values thereof to a plurality of waveform index numbers is associated with respective ones of the waveform serial numbers defining a calibrated image file. The printer further comprises an image halftoning unit connected to the calibrator for halftoning the calibrated image file. This calibration is done in order to generate a halftoned image file having a plurality of pixel values defined by the waveform serial numbers. In addition, the printer includes a nozzle selector interconnecting the waveform generator and the print head for selecting predetermined ones of the nozzles for actuation. Moreover, the printer comprises an electromechanical transducer disposed in each of the nozzles and responsive to the waveforms for ejecting the ink droplets from the nozzles. The electromechanical transducer may be a piezoelectric transducer. Alternatively, a heat generating element may be disposed in each of the nozzles and responsive to said waveforms for ejecting the ink droplets from said nozzles. In this case, the heat generating element may be a thermal resistive heat generating element. The previously mentioned look-up table has a plurality of predetermined parameters therein including the number of pulses, pulse amplitude, pulse width and delay time intervals between pulses for respective waveforms. At least one of the delay time intervals between pulses may be zero, if desired.

An object of the present invention is to provide an ink jet printer capable of reproducing high-quality digital images of variable tone scales.

Another object of the present invention is to provide an ink jet printer capable of accurate ink droplet placement on the receiver medium.

A feature of the present invention is the provision of a printer performance look-up table comprising at least one timing control parameter for at least one electronic waveform for suitably driving the ink jet print head.

An advantage of the present invention is that the effects of variable temporal duration of the electronic waveforms are eliminated in placing the ink droplets.

A further advantage of the present invention is that the effects of the variable ink-droplet velocities are compensated by accurate placement of the ink droplets.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing-out and distinctly claiming the subject matter of the present invention, it is believed the invention will be better understood from the following description when taken in conjunction h the accompanying drawings wherein:

FIG. 2 shows an enlargement of the LUT of FIGS. 1a and 1b;

DETAILED DESCRIPTION OF THE INVENTION

As described in detail hereinbelow, the present invention provides an apparatus and method using timing control of electronic waveforms for variable gray scale printing while eliminating image artifacts caused by quantization errors, visible noise and excessive ink laydown, and while also reducing printing time and improving accuracy of ink droplet placement on a receiver medium.

Figure 1A:
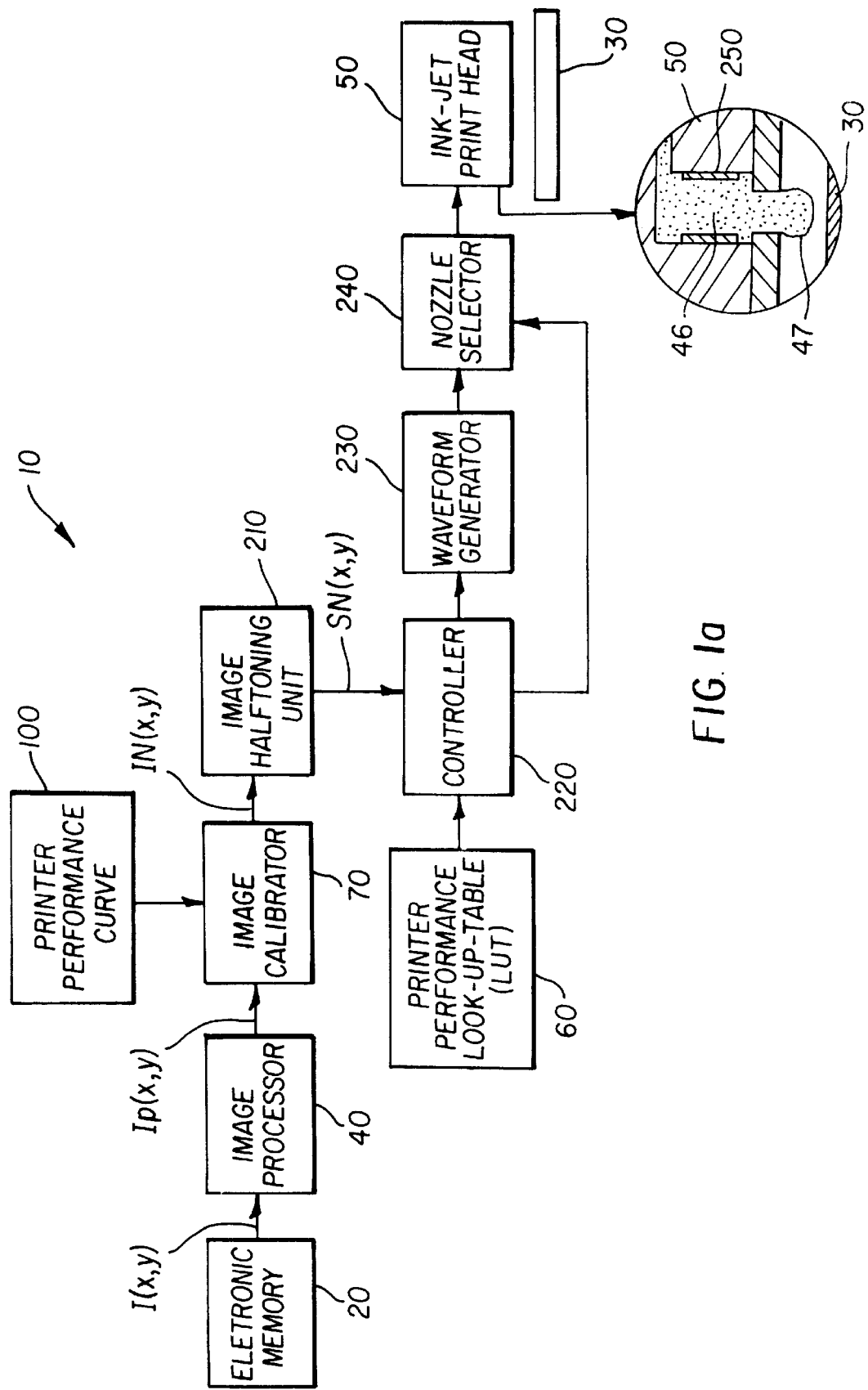
FIG. 1a shows a first embodiment system block diagram belonging to the present invention, the system block diagram including a printer performance LUT (Look-Up Table) and a printer performance curve and also including an electromechanical transducer associated with an ink nozzle to eject an ink droplet therefrom.
Figure 1B:
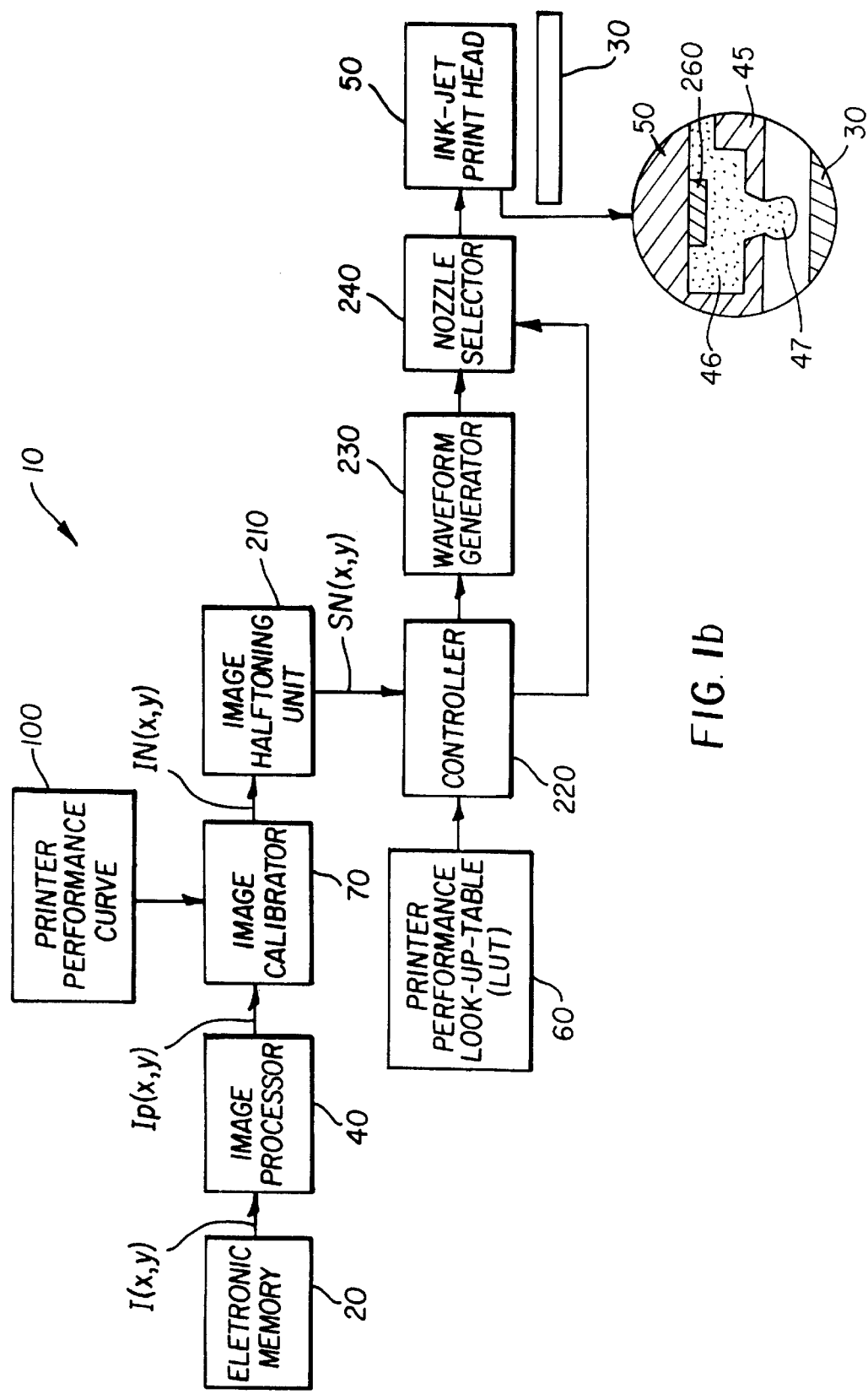
FIG. 1b shows a second embodiment system block diagram belonging to the present invention, the system block diagram including the printer performance LUT and the printer performance curve and also including a heat generating element associated with the ink nozzle to eject the ink droplet therefrom.

Therefore, referring to FIGS. 1a and 1b, first and second embodiment system block diagrams, both generally referred to as 10, include an electronic memory 20 having a digital input image file I(x,y) stored therein. With respect to image file I(x,y), the letters "x" and "y" designate column and row numbers, respectively, the combination of which define pixel locations in an input image plane (not shown). More specifically, a plurality of color pixels with a color pixel value at each "x" and "y" location will preferably correspond to pixels having desired color densities (i.e., "aim color densities") when printed on a receiver medium 30. Image file I(x,y) may be generated by a computer or, alternatively, provided as an input generated from a magnetic disk, a compact disk, a memory card, a magnetic tape, a digital camera, a print scanner, a film scanner, or the like. Moreover, image file I(x,y) may be provided in any suitable format well known in the art, such as page-description language or bitmap format.

Still referring to FIGS. 1a and 1b, electrically connected to electronic memory 20 is an image processor 40, which processes image file I(x,y) by performing any one of several desired operations on image file I(x,y). These operations, for example, may be decoding, decompression, rotation, resizing, coordinate transformation, mirror-image transformation, tone scale adjustment, color management, in addition to other desired operations. Image processor 40 in turn generates an output image file $I_p(x,y)$, which includes a plurality of pixel values having color code values, the pixel values respectively corresponding to a plurality of ink delivery nozzles 45 (only one of which is shown) integrally connected to an ink jet print head 50. Each nozzle 45 defines an ink chamber 46 therein for ejecting an ink droplet 47 therefrom.

Referring now to FIGS. 1a, 1b, 2 and 3, data related to performance of apparatus 10 have been previously stored in a printer performance LUT (Look-Up Table) 60 and a printer performance curve 100 (see FIG. 5), as described more fully hereinbelow. Moreover, image file $I_p(x,y)$ is preferably calibrated by means of an image calibrator 70 which converts the color pixel values at each pixel to a plurality of waveform index numbers IN obtained from a continues waveform function constructed in a manner described in detail hereinbelow. LUT 60 provides an electronic waveform, generally referred to as 80, which may comprise a plurality of "square" pulses, generally referred to as 90 (only three of which are shown), for driving print head 50. Electronic waveform 80 is characterized by a set of predetermined parameters, which predetermined parameters may be the printing start time Ti, number of pulses, pulse widths (i.e., $W_1, W_2, W_3$...), voltage pulse amplitudes (i.e., $A_1, A_2, A_3$...), and delay time intervals (i.e., $S_{1-2}, S_{2-3}$...) between pulses 90. Predetermined values of pulse amplitudes, widths and delay time intervals between pulses are selected according to a desired mode of operating print head 50. For example, a desired mode of operation for a piezoelectric ink jet print head 50 may be that frequencies of pulses 90 be reinforced by the resonance frequencies of ink chamber 46, which is associated with each ink nozzle 45, so that the amount of energy input to nozzle 45 to cause ink ejection therefrom is minimized. Predetermining the values of the number of pulses, pulse amplitude, pulse width and delay time intervals between pulses results in discrete ink droplet volumes modulatable by electronic waveform 80. It is understood from the teachings herein that square pulses 90 are only an example of many possible electronic pulse shapes usable for driving print head 50. Alternative pulse shapes usable with the present invention include, for example, triangular-shaped, trapezoidal-shaped, and sinusoidal-shaped pulses, either in unipolar or bi-polar voltages. In addition, electronic waveform 80 may be fully or partially continuous without one or more of the delay time intervals ($S_{1-2}, S_{2-3}$...) Such alternative waveforms are characterized by predetermined parameters in similar fashion to the example shown for square-shaped pulses 90. For example, a continuous sinusoidal wave may be characterized by the period and the amplitude of each cycle or each half cycle plus a constant voltage offset.

Figure 3:
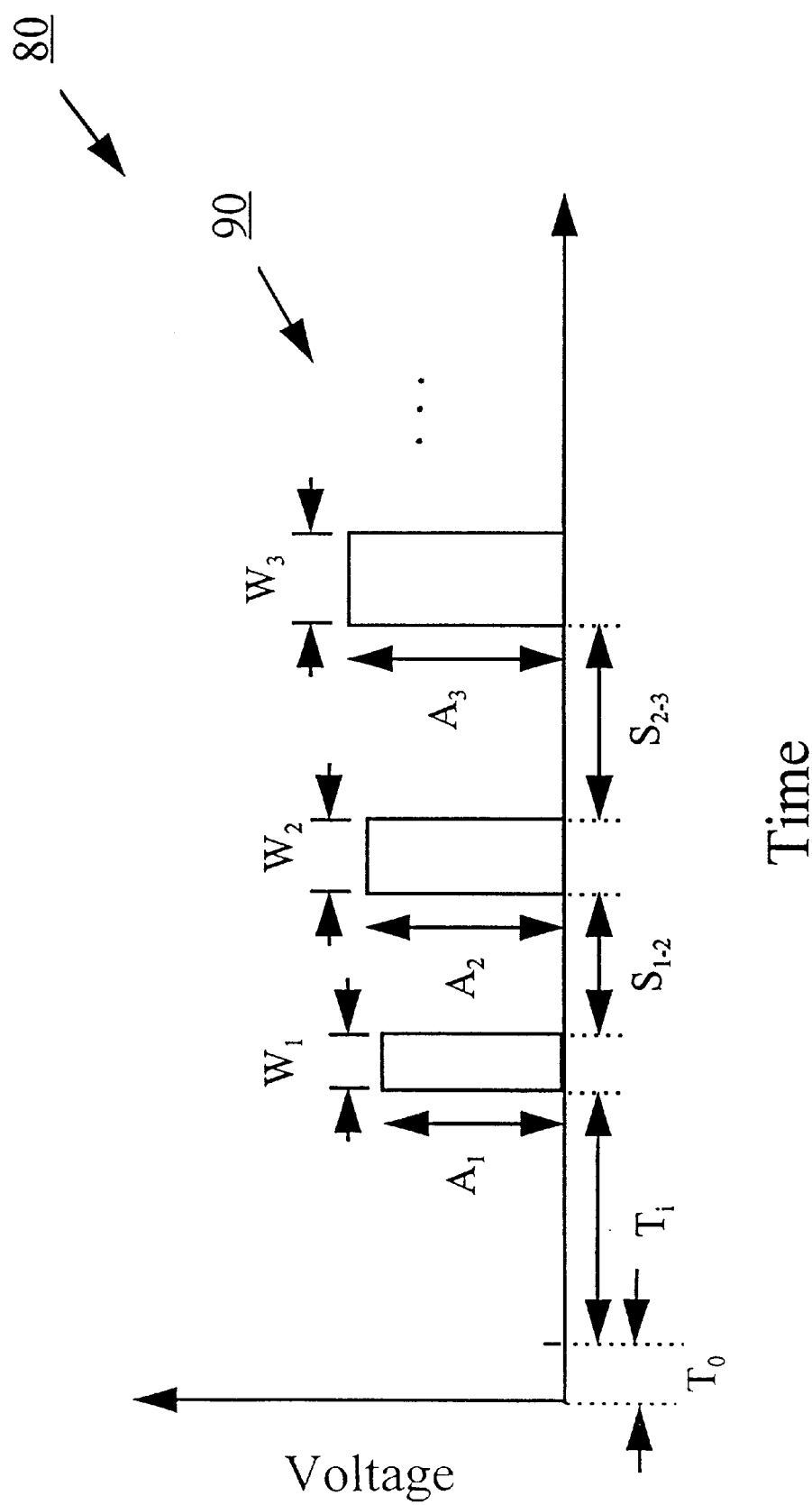
FIG. 3 is a graph illustrating an electronic waveform comprising a plurality of voltage pulses, the waveform being defined by a plurality of predetermined parameters including printing start time, number of pulses, pulse amplitude, pulse width and delay time intervals between pulses.
Figure 4:
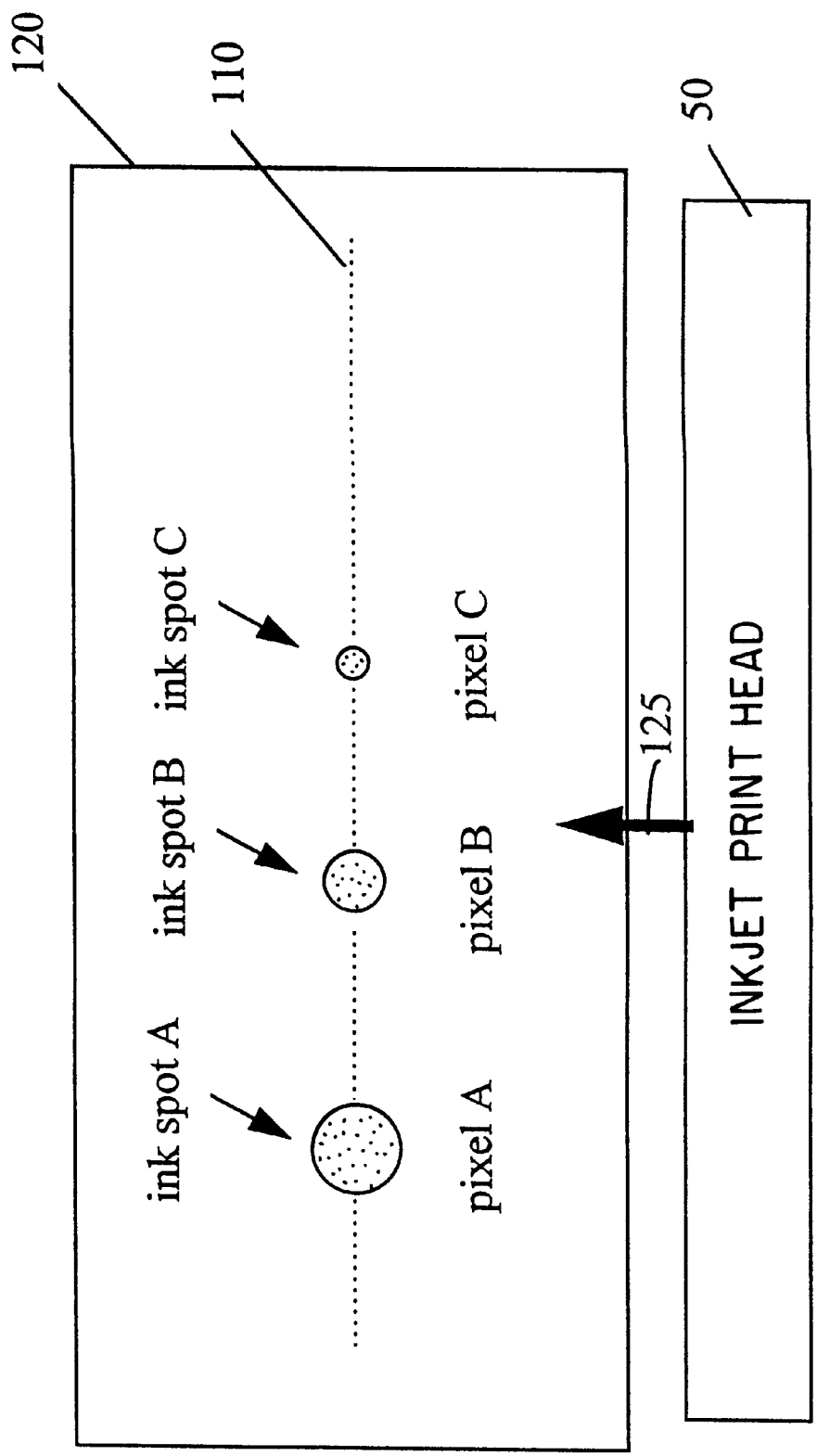
FIG. 4 shows placement of ink droplets of variable diameters or sizes on the receiver medium.

Referring to FIGS. 3 and 4, it is important to control timing of each electronic waveform 80. It is important to control timing of waveforms 80 in order to eliminate variabilities in ink droplet placement caused by the difference in the width $W_i$ of pulses 90 belonging to electronic waveform 80 and the difference in ejection velocities of droplets 47. Timing control for the electronic waveform 80 is achieved by a starting time delay $T_i$ between or separating waveforms 80. In this case i=1, 2, 3... N where "N" is the total number of waveforms 80. Examples of ink droplet placement using this technique is illustrated in FIG. 4.

As best seen in FIG. 3, the previously mentioned time delay $T_i$ for the series of electronic waveform numbers $SN_i$ separating pulses 90 of waveform 80 can be expressed as $$T_i = T_o + T_i + W/2 + T_f \qquad \text{Equation (1)}$$

in which $T_o$ is a start time for a printing line 110, which can include electronic or mechanical delays for activating ink droplet 47 in nozzle 45, by means of electronic waveform 80. $T_o$ is a constant for different waveforms $SN_i$. $T_1$ (not shown in FIG. 3) is the time that ink droplet 47 lands on receiver 30, which occurs after start time $T_o$. For ideal ink droplet placement, $T_1$ is designed to be constant for ink droplets 47 of different volumes for each printing line 110 (see FIG. 4), which is discussed hereinbelow with regard to FIG. 4. $T_i$ is the time delay that is variable for different waveforms, as determined by W and $T_f$, which are further described hereinbelow. $T_f$ is the in-flight time of ejected ink droplet 47 traveling from ejection to landing on receiver 30 and which is equal to the nozzle-to-receiver distance divided by ink-droplet velocity in a direction normal to receiver 30. For a fixed nozzle-to-receiver distance, $T_f$ is therefore inversely proportional to the velocity of the ejected ink droplet 47. The starting time $T_i$ of each printing line is determined by clock cycles provided by a computer (not shown) or by signals obtained by detecting spaced-apart markings residing on an encoder strip (also not shown). According to the present invention, "W" is the total temporal duration of the electronic waveform 80 excluding $T_i$, as discussed more fully hereinbelow. In this regard, for the electronic waveform labeled as $SN_2$ in LUT 60, $$W = W_1 + S_{1-2} + W_2. \qquad \text{Equation (2)}$$

However, W and $T_f$, and thus the time delay $T_i$, are usually different for ink droplets 47 activation associated with different electronic waveform serial numbers $SN_i$. For example, for some ink jet printers it is possible to design print head 50 such that ink droplets 47 having different volumes are ejected at essentially the same velocity. In this case, variation between different electronic waveform serial numbers $SN_i$ is W/2. The fraction ½ is included in Equation (1) so that the centers of ink droplets 47 are placed at the center of a pixel on the receiver 30 for ink droplets 47 of different volumes. Ink droplets 47 of different volumes are activated by different electronic waveform serial numbers $SN_i$'s. In this manner, ink spots A, B and C of different diameters or sizes are symmetrically placed within a pixel on receiver 30.

As best seen in FIG. 4, print head 50 prints line 110 in an image area 120 on receiver 30 by scanning image area 120 in a direction indicated by an arrow 125. In this example, three ink spots A, B, and C are placed at pixels A, B, and C, respectively, along print line 110 in image area 120. For purposes of example only and not by way of limitation, ink spots A, B and C are shown having different diameters or sizes. Ideally, ink spots A, B and C are all symmetrically placed on print line 110.

The detailed description hereinabove provides examples in which one embodiment timing control, by means of time delays $T_i$, is used in ink jet printing apparatus 10. It is appreciated that other embodiments for timing control may be used. For example, alignment between a plurality of print heads 50 each having a different color ink may require time delays $T_i$ for the electronic waveforms 80 to be dependent on a selected ink color in order to assure registration between colors. As another example, time delays $T_i$ for each printing direction in a bidirectional printing mode (i.e. printing when print head 50 is scanning relative to receiver 30 in either direction of travel of print head 50) may be adjusted so that ink droplets 47 are placed at the centers of the pixels on receiver 30 regardless of the direction of travel of print head 50. In this example, time delays $T_i$ may depend on the direction of the printing. As a further example, distance between nozzles 45 and receiver 30 may differ for different receiver types and/or for print heads 50 having different color inks. Of course, in this case values of the nozzle-to-receiver distances need to be properly input to calculate $T_f$ in Equation (1). Finally, timing control of ink jet printing apparatus 10 may be made dependent on the operator-selected printing mode, which printing mode may be, for example, printing speed, receiver type and/or output image resolution.

Returning to FIGS. 2 and 3, LUT 60 includes a plurality of optical density values $D_i$ (i=1, ..., $D_{max}$) corresponding to a plurality of electronic waveforms 80, with each waveform 80 being described by waveform serial numbers $SN_i$ (i=1, ..., N). "$D_{max}$" is the maximum achievable optical density. As used herein, the terminology "optical density" refers to reflectance or transmittance optical densities as measured by a densitometer (not shown) set in the well-known reflectance "Status A" mode or transmittance "Status M" mode. Such reflectance and transmittance optical densities are measured from reflectance (e.g., coated paper) or transmittance (e.g., transparent film) ink receivers 30. Density $D_i$ itself is measured from a uniform density patch formed on a test image (not shown), which test image is printed by driving nozzles 45 with waveform 80 which is in turn determined by the waveform serial numbers $SN_i$, where i=1, 2, 3, ... N and where "N" is the total number of electronic waveforms 80 in LUT 60. LUT 60 also includes the previously mentioned predetermined parameters, which characterize waveform 80. As previously mentioned, these parameters are the printing starting time $T_i$, the number of pulses, the widths ($W_1, W_2, W_3$...), the amplitudes ($A_1, A_2, A_3$...), and the delay time intervals between pulses ($S_{1-2}, S_{2-3}$...). In LUT 60, optical densities $D_1, D_2, D_3$... are tabulated as a monatomic function of waveform serial numbers $SN_i$ for a predetermined electronic waveform 80 (e.g., comprising square waves 90). However, it is understood from the teachings herein that a different set of parameters will obtain for electronic waveforms other than the square waveform 80 shown in FIG. 3.

Moreover, still referring to FIGS. 2 and 3, it may be understood that the series of electronic waveform serial numbers $SN_i$ listed in LUT 60 are only a subset of all possible electronic waveforms serial numbers determining the electronic waveform 80 which is used to drive ink jet print head 50. However, it may be appreciated that, when printing with all possible electronic waveforms, many of these electronic waveforms result in equal or similar optical densities $D_i$. Only suitable ones of these waveforms need be selected and listed as the electronic waveforms in LUT 60. Such a selection is made by minimizing a gap or difference "g" between any two consecutive optical densities $D_i$ and the corresponding two consecutive waveform serial numbers $SN_i$. Minimizing such gaps or differences "g" minimize quantization errors for arriving at suitable waveforms 80.

Figure 5:
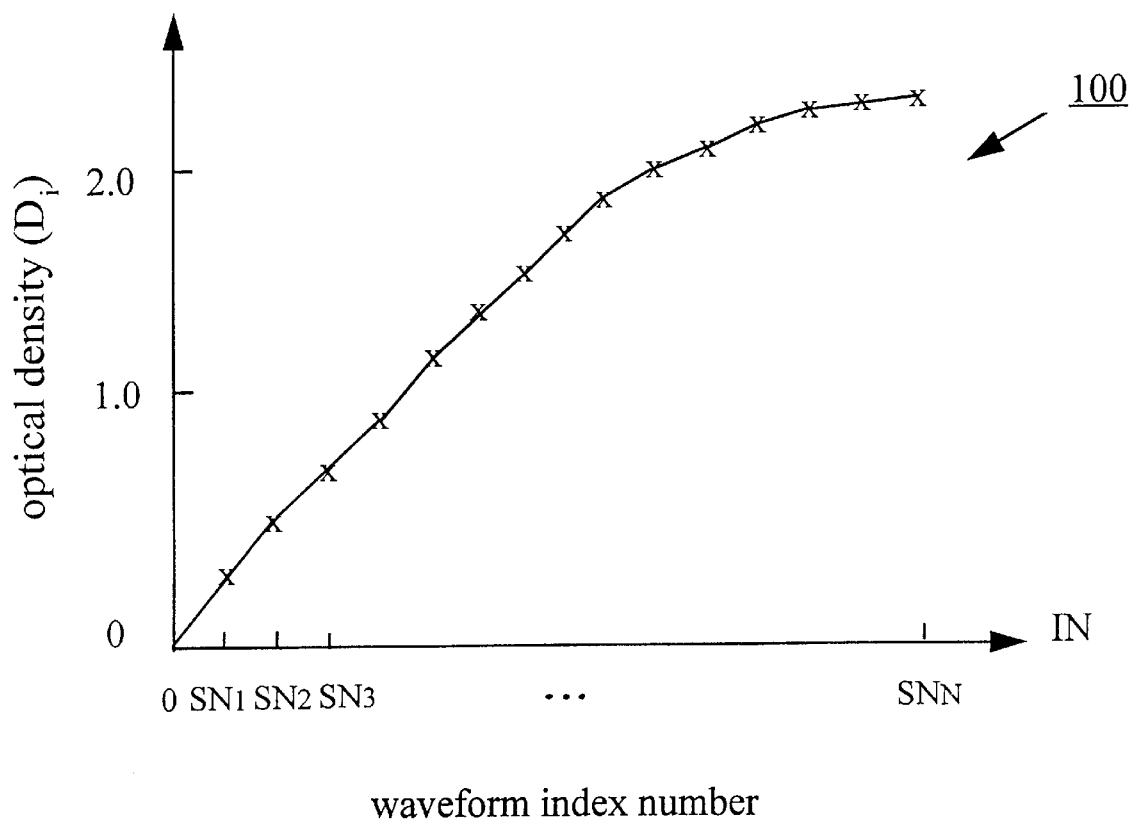
FIG. 5 is a graph illustrating the printer performance curve of FIGS. 1a and 1b.

Referring to FIG. 5, there is shown the printer performance curve 100 formed by plotting optical density $D_i$ as a function of waveform index number IN. To form printer performance curve 100, the N electronic waveforms in LUT 60 are used to print the previously mentioned test image comprising uniform-density patches (not shown) from which optical densities $D_i$ are obtained in a manner well-known in the art. In this regard, optical densities $D_i$ are obtained for each waveform serial number $SN_i$ producing waveform 80. The plurality of "x" symbols shown in FIG. 5 represent data points obtained from LUT 60 corresponding to the $SN_i$'s in LUT 60. Data points "x" are interpolated by techniques well known in the art to produce a continuous curve for expressing IN as a continuous variable. The difference between waveform serial numbers $SN_i$ and waveform index numbers IN is as follows: waveform serial number $SN_i$ describe discrete optical density levels (i.e., tones) that ink jet printer apparatus 10 is capable of producing. With respect to $SN_i$, the total level N ranges from 2 to 64 available levels, that is, 1 to 6 bit depth. The plurality of waveform index numbers IN, on the other hand, comprise a continuous variable and thus represent continuous tone. Of course, there should be higher than 8 bit levels ($2^8$), for example, 10–12 bits, used to describe the waveform index numbers IN.

Returning now to FIGS. 1a and 1b, image file $I_p(x,y)$ is calibrated by image calibrator 70. $I_p(x,y)$ includes a multiplicity of color pixel values for each of the plurality of color planes, which color planes may be yellow, magenta and cyan color planes. That is, each color code value is associated with the previously mentioned aim optical density for that color. More specifically, each color pixel value is defined by input image file I(x,y). The calibration performed by image calibrator 70 converts each color pixel value to a waveform index number IN using (a) the aim density at that pixel for that color and (b) printer performance curve 100 (see FIG. 5). As shown in FIGS. 1a and 1b, this calibration process results in an image file IN(x,y) with pixel values described by waveform index numbers IN.

Still referring to FIGS. 1a and 1b, image halftoning unit 210 is used to minimize image artifacts. As used herein, the terminology "image halftoning" refers to the image processing technique which creates the appearance of intermediate tones by the spatial modulation of two tone levels, for example, black and white, or by spatial modulation of multiple tones levels, such as black, white and a plurality of gray levels. Halftoning improves image quality by minimizing image artifacts such as contouring and noise, both of which result from printing with a finite number of tone levels. In cases where multiple tone levels are used, image halftoning is often referred to as multiple level halftoning, or multi-level halftoning, or simply multi-toning. In the preferred embodiment of the invention, the term image halftoning includes bi-level halftoning, as well.

That is, as shown in FIGS. 1a and 1b, calibrated image file IN(x,y), which is input to image halftoning unit 210, comprises a multiplicity of pixels with each pixel described by waveform index numbers IN for each color. As described hereinabove, the waveform index numbers IN are effectively continuous in nature, which waveform index numbers IN are described in more than 8 bit per pixel per color. The total number of waveform serial numbers, N, corresponding to different optical densities, is in the range $2^1$ to $2^6$, which is much smaller than the total number of waveform index numbers IN. In this manner, the invention quantizes optical densities $D_i$. However, simple quantization of optical densities $D_i$, represented by the waveform serial numbers $SN_i$, may nonetheless give rise to visible image artifacts on the printed image. Therefore, in order to solve this problem image halftoning unit 210 quantifies the calibrated image file IN(x,y) with pixel values described by the continuous waveform index number IN in order to form an image file SN(x,y) with pixel values described by waveform serial numbers $SN_i$. This result is accomplished by spatially modulating adjacent waveform serial numbers $SN_i$ (i.e., image halftoning). The waveform serial numbers $SN_i$'s generated in this manner are stored in LUT 60.

In FIGS. 1a and 1b, halftoned image file SN(x,y) is next sent to a controller 220. Controller 220 performs the function of controlling the corrected waveforms generated for corresponding pixels. Controller 220 accomplishes this function by (a) receiving a waveform serial number $SN_i$ at each pixel location (x,y) for each color of the halftoned image file SN(x,y); (b) looking up the waveform parameters corresponding to the waveform serial number SN at that pixel and color of SN(x,y) using LUT 60; (c) sending the previously mentioned waveform parameters to waveform generator 230; and (d) selecting the correct nozzle 45 corresponding to that color and the pixel by sending signals to a nozzle selector 240 that is connected to waveform generator 230. According to the present invention, the previously mentioned waveform parameters, which are provided by LUT 60, include the starting time delays $T_i$'s which compensate for time differences between ink droplets 47 of different volumes.

Referring to FIGS. 1a, 1b and 4, waveform generator 230 generates correct waveforms 80 in response to the waveform parameters, which include time delay time intervals $S_i$ controlled by controller 220. Electronic waveforms 80 with preselected delay time intervals $S_i$ are then sent to nozzle selector 240 for actuating an electromechanical transducer 250 or a thermal heat generating element 260 associated with each ink nozzle 45 in print head 50 to eject each droplet 47. In this regard, transducer 250 may be a piezo-electric transducer. Alternatively, each nozzle 45 may include heat generating element 260, rather than transducer 250, which heat generating element 260 is disposed in nozzle 45 for generating thermal energy in response to electronic waveforms 80 in order to eject ink droplets 47 from nozzle 45. In addition, waveform generator 230 may include an electronic circuit (not shown), for producing the correct digital waveforms 80, may further include a digital-to-analog converter (not shown), and at least one amplifier (also not shown). In the present invention, ink droplets 47 of different volumes are ejected along each print line 110 in image area 120 starting at different times as determined by starting time delay $T_i$ in LUT 60. It may be appreciated that one or more pulses 90 comprising waveform 80 may have a different time duration $W_i$ and/or a different amplitude $A_i$ co-acting to obtain desired in-flight velocities and volumes of droplets 47. Thus, ink droplets 47 having different volumes are accurately placed on receiver 30 to produce ink spots in a symmetric fashion on print line 110. In the manner disclosed hereinabove, image-wise activation and ink ejection of ink droplets 47 reproduce the digital input image I(x,y) on receiver 30 without image artifacts.

The invention has been described in detail with particular reference to certain preferred embodiments thereof, but it will be understood that variations and modifications can be effected within the spirit and scope of the invention. For example, the present invention is compatible with an ink-jet printer apparatus using inks of different densities for each color. As another example, the present invention may also incorporate other printing modes such as printing a plurality of ink droplets at each image location on a receiver medium in one or more passes.

Therefore, what is provided is an ink jet printing apparatus and method using timing control of electronic waveforms for variable gray scale printing while reducing image artifacts caused by "quantization errors", visible noise, excessive ink laydown, and while also reducing printing time and improving accuracy of ink droplet placement on a receiver medium.

The invention has been described in detail with particular reference to certain preferred embodiments thereof, but it will be understood that variations and modifications can be effected within the spirit and scope of the invention.

PARTS LIST

10... system block diagram
20... electronic memory
30... receiver medium
40... image processor
45... nozzle
46... ink chamber
47... ink droplet
50... inkjet print head
60... printer performance look-table
70... image calibrator
80... waveform
90... group of square pulses
100... printer performance curve
110... printing line
120... image area
125... arrow
210... image halftoning unit
220... controller
230... waveform generator
240... nozzle selector
250... electromechanical transducer
260... heater element

What is claimed is:

1. An inkjet printing apparatus for printing an output image in response to an input image file defined by a plurality of pixel values, comprising:

(a) a nozzle capable of ejecting a plurality of ink droplets of variable volume therefrom;

(b) a waveform generator connected to said nozzles for generating a plurality of electronic waveforms each preceded by a starting time delay, each of the waveforms defined by a plurality of electric pulses supplied to said nozzles for ejecting the ink droplets therefrom;

(c) a storage location associated with said waveform generator, for storing a plurality of waveform serial numbers therein associated with each one of the electronic waveforms, each of the waveforms being defined by waveform parameters;

(d) a controller connected to said storage location and the waveform generator for generating the waveform parameters allowing the waveforms to eject the ink droplets from said nozzles so as to accurately place the ink droplets on a receiver medium; and (e) a calibrator adapted to receive the input image file for converting the pixel values thereof to a plurality of waveform index numbers obtained from a continuous waveform function, the waveform index numbers being associated with respective ones of the waveform serial numbers defining a calibrated image file.

2. The apparatus of claim 1, further comprising a controller connected to said waveform generator for controlling the pulses in order to control timing of ejection of ink droplets from said nozzle.

3. An ink jet printing apparatus for printing an output image on a receiver medium in response to an input image file defined by a plurality of pixels, each pixel obtaining a pixel value, comprising:

(a) a print head body;

(b) a plurality of nozzles integrally attached to said print head body, each of said nozzles capable of ejecting a plurality of ink droplets therefrom;

(c) a waveform generator connected to said nozzles for generating a plurality of electronic waveforms each preceded by a starting time delay, each of the waveforms defined by a plurality of electric pulses supplied to said nozzles for ejecting the ink droplets therefrom;

(d) a storage location associated with said waveform generator for storing a plurality of waveform serial numbers therein associated with each one of the electronic waveforms, each of the waveforms being defined by waveform parameters;

(e) a controller connected to said storage location and the waveform generator for generating the waveform parameters allowing the waveforms to eject the ink droplets from said nozzles so as to accurately place the ink droplets on the receiver medium; and (f) a calibrator adapted to receive the input image file for converting the pixel values thereof to a plurality of waveform index numbers obtained from a continuous waveform function, the waveform index numbers being associated with respective ones of the waveform serial numbers defining a calibrated image file.

4. The apparatus of claim 3, further comprising an image halftoning unit connected to said calibrator for halftoning the calibrated image file in order to generate a halftoned image file having a plurality of pixel values defined by the waveform serial numbers.

5. The apparatus of claim 3, further comprising a nozzle selector interconnecting said waveform generator and said print head for selecting predetermined ones of said nozzles for actuation.

6. The apparatus of claim 3, further comprising an electromechanical transducer disposed in each of said nozzles and responsive to said waveforms for ejecting the ink droplets from said nozzles.

7. The apparatus of claim 6, wherein said electromechanical transducer is a piezoelectric transducer.

8. The apparatus of claim 3, further comprising a heat generating element disposed in each of said nozzles and responsive to said waveforms for ejecting the ink droplets from said nozzles.

9. The apparatus of claim 8, wherein said heat generating element is a thermal resistive heat generating element.

10. The apparatus of claim 3, further comprising a look-up table having a plurality of predetermined parameters including number of pulses, pulse amplitude, pulse width and delay time intervals between pulses for respective waveforms.

11. The apparatus of claim 10, wherein at least one of the delay time intervals between pulses is zero.

12. An ink jet printing method of printing an output image on a receiver medium in response to an input image file defined by a plurality of pixels, each pixel obtaining a pixel value, comprising the steps of:

(a) providing a print head body;

(b) providing a plurality of nozzles integrally attached to the print head body, each of the nozzles capable of ejecting a plurality of ink droplets therefrom;

(c) providing a waveform generator connected to the nozzles for generating a plurality of electronic waveforms each preceded by a starting time delay, each of the waveforms defined by a plurality of electric pulses supplied to the nozzles for ejecting the ink droplets therefrom;

(d) providing a printer performance look-up table associated with the waveform generator for storing a plurality of waveform serial numbers therein associated with each one of the electronic waveforms, each of the waveforms being defined by waveform parameters including delay time intervals between pulses;

(e) providing a controller connected to the look-up table and the waveform generator for generating the waveform parameters allowing the waveforms to eject the ejection of the ink droplets from the nozzles so as to accurately place the ink droplets on the receiver medium; and (f) providing a calibrator adapted to receive the input image file for converting the pixel values thereof to a plurality of waveform index numbers obtained from a continuous waveform function, the waveform index numbers being associated with respective ones of the waveform serial numbers defining a calibrated image file.

13. The method of claim 12, further comprising the step of providing an image halftoning unit connected to the calibrator for halftoning the calibrated image file in order to generate a halftoned image file having a plurality of pixel values defined by the waveform serial numbers.

14. The method of claim 12, further comprising the step of providing a nozzle selector interconnecting the waveform generator and the print head for selecting predetermined ones of the nozzles for actuation.

15. The method of claim 12, further comprising the step of providing an electromechanical transducer disposed in the nozzle and responsive to the waveforms for ejecting the ink droplets from the nozzles.

16. The method of claim 15, wherein the step of providing an electromechanical transducer comprises the step of providing a piezoelectric transducer.

17. The method of claim 12, further comprising the step of providing a heat generating element disposed in the nozzle and responsive to the waveforms for ejecting the ink droplets from the nozzles.

18. The method of claim 17, wherein the step of providing a heat generating element comprises the step of providing a thermal resistive heat generating element.

19. The method of claim 12, wherein the step of providing a look-up table comprises the step of providing a plurality of predetermined parameters including number of pulses, pulse amplitude, pulse width and delay time intervals between pulses for respective waveforms.

20. The method of claim 19, wherein the step of providing a plurality of predetermined parameters comprises the step of providing a plurality of predetermined parameters wherein at least one of the delay time intervals between pulses is zero.

* * * * *